Patented May 1, 1945

2,375,024

UNITED STATES PATENT OFFICE 2,375,024

ISOMERIZATION OF POLY-OLEFINIC HYDROCARBONS

Rupert C. Morris and John L. Van Winkle, Berkeley, Calif., assignors to Shell Development Company, San Francisco, Calif., a corporation of Delaware No Drawing. Application May 26, 1943, Serial No. 488,792

8 Claims. (Cl. 260—680)

This invention relates to the isomerization of certain poly-olefinic hydrocarbons and more particularly pertains to a process for the isomerization of branched chain acyclic poly-olefins of at least 6 carbon atoms. In one of its more specific embodiments, the invention is directed to the isomerization of certain branched chain acyclic 1,3-dienes, e. g. 4-methyl pentadiene-1,3.

It is known that various acyclic diolefinic hydrocarbons having the double bonds in conjugated position will react with sulfur dioxide to produce cyclic sulfones. For example, butadiene-1,3 may be reacted via addition with sulfur dioxide to produce 3-sulfolene, which compound is also known as "butadiene sulfone" or "thiacyclo-3-pentene-1-1-dioxide." It is also known that crystalline cyclic mono-sulfones of the type produced by the aforementioned addition reaction between a diolefin and sulfur dioxide may be decomposed, as by heating, to yield substantially quantitative amounts of the acyclic diolefin. As a general rule, the acyclic diolefinic hydrocarbon produced by such decomposition of the cyclic unsaturated sulfone is the same as that which originally reacted with the sulfur dioxide to produce the sulfone. For example, 3-sulfolene (which is the product of an addition reaction between sulfur dioxide and butadiene-1,3) upon heating decomposes substantially quantitatively to the starting materials, namely sulfur dioxide and butadiene-1,3. Similarly, 3-methyl-3-sulfolene, which may be prepared for instance by reacting isoprene with sulfur dioxide at a temperature of about 100° C. and a superatmospheric pressure of between about 150 and about 500 lbs. per sq. in., may be decomposed by distillation at atmospheric pressure and at temperatures of between about 120° C. and about 130° C. to yield substantially quantitative amounts of isoprene and sulfur dioxide. Also, piperylene may be similarly formed by decomposing 2-methyl-3-sulfolene, which is a product of addition between sulfur dioxide and piperylene.

It has been recently proposed to produce branched chain polyolefinic compounds from carbonylic compounds by reacting a carbonylic compound, i. e. an aldehyde or a mono- or polyketone, either with itself or with another carbonylic compound to produce an aldol, ketol or ketaldol, then hydrogenating the aldol, ketol or ketaldol thus formed to form a dehydratable polyhydroxy compound, and finally catalytically dehydrating this polyhydroxy compound to the desired poly-olefinic compound. For example, it has been proposed to bring acetone into contact with a solid basic condensation catalyst, e. g. alkali bicarbonates, carbonates, acetates, cyanides, and/or alcoholates, to form diacetone alcohol, reacting the latter with hydrogen in the presence of, for example, a hydrogenation catalyst such as pyrophoric nickel metal catalyst under a superatmospheric pressure and at a temperature of between about 50° C. and about 125° C. to form diacetone glycol, and catalytically dehydrating the diacetone glycol, for example, by heating it at a temperature below its boiling point in the presence of iodine or hydrochloric acid to convert at least a part of the diacetone glycol to methyl pentadienes. When the reaction is effected in accordance with the above outlined process, the hexadienes formed consist of or at least essentially comprise a mixture of two structural hexadiene isomers, namely 2-methyl pentadiene-1,3 and 4-methyl pentadiene-1,3.

Although all poly-olefinic hydrocarbons are highly useful and may be employed as intermediates in various chemical and technological industries and/or processes, at least for some purposes certain of these poly-olefinic compounds are more suitable than others such as their structural isomers. For example, 2-methyl pentadiene-1,3 readily reacts via the Diels-Alder type reaction with various alpha-beta unsaturated carbonylic compounds, e. g. maleic anhydride or acrolein, while 4-methyl pentadiene-1,3, which as stated above is a structural isomer of the 2-methyl pentadiene-1,3, is wholly unsuitable for such purposes. Also, the 2-methyl pentadiene-1,3 may be much more readily co-polymerized with, for example, butadiene, styrene, and/or acrylonitrile, than the 4-methyl pentadiene-1,3.

It is therefore an object of the present invention to convert the less desirable poly-olefinic compounds into their more valuable isomers. Another object of the invention is to provide a process whereby the diolefins of the class defined more fully hereinbelow may be readily and effectively converted into their structural isomers which find greater utilization than the starting material. Still other objects of the invention will be apparent from the following disclosure.

It has been stated above that at least some of the acyclic polyolefins such as conjugated diolefins of the type of butadiene-1,3, isoprene, piperylene, 2-methyl pentadiene-1,3 and 2,3-dimethyl butadiene-1,3, may be converted to the corresponding cyclic unsaturated sulfones, and that when these sulfones are subjected to heat they decompose to produce substantially quantitative amounts of the particular acyclic diolefin which originally reacted with the sulfur dioxide to produce the cyclic sulfone. It has now been discovered that certain acyclic poly-olefins having conjugated double bonds do not react in the above outlined manner but will be isomerized when they are first treated with sulfur dioxide to form the corresponding cyclic monosulfones (substituted sulfolenes) and the latter are then heated to cause their decomposition, i. e. liberation of the sulfur dioxide. More specifically stated, it has been discovered that certain poly-olefins may be converted into their structural isomers by reacting these poly-olefins with sulfur dioxide under conditions causing the formation of the corresponding unsaturated cyclic sulfones, and then treating these sulfones to effect their decomposition which liberates the sulfur dioxide and the structural isomers of the starting poly-olefinic hydrocarbon or hydrocarbons.

The process of the present invention may be employed for the isomerization of acyclic 1,3-dienes of at least six carbon atoms, said dienes having a hydrocarbon radical, and preferably an alkyl radical or side-chain, in the 4-position. An especially suitable sub-group of such dienes comprises the 1,3-dienes containing a methyl radical attached to the carbon atom in the 4-position. The following are illustrative examples of dienes belonging to the last-mentioned sub-group: 4-methyl pentadiene-1,3, 4-methyl hexadiene-1,3, 4-methyl heptadiene-1,3, and their homologues. As stated, the substituent attached to the unsaturated carbon atom in the 4-position may comprise any alkyl radical, e. g. ethyl, propyl, butyl, etc. Also, these radicals may contain other substituents, such as a halogen atom, attached thereto.

As mentioned, it has been discovered that the above class of poly-olefinic hydrocarbons, and particularly the 4-methyl pentadiene-1,3 as well as its homologues, analogues and suitable substituted derivatives, may be isomerized by contacting said poly-olefins with sulfur dioxide under conditions favoring the addition reaction and the formation of the corresponding unsaturated cyclic mono-sulfones, and the subsequent decomposition of these mono-sulfones to yield a poly-olefin or poly-olefins which are structural isomers of the poly-olefin employed in the formation of the cyclic sulfone. For example, the treatment of 4-methyl pentadiene-1,3 in accordance with the process of the present invention results in a substantially quantitative conversion of said diene to its relatively more valuable isomer, viz. 2-methyl pentadiene-1,3.

Since a reaction between a conjugated poly-olefin, such as a diolefin of the class described hereinabove, may result in the formation of insoluble amorphous products which do not readily yield the poly-olefins when subjected to ordinary processes of decomposition, it is generally necessary to employ certain precautions during the first step, i. e. during the interaction of the poly-olefins with the sulfur dioxide. The above mentioned amorphous compounds are poly-olefin poly-sulfones, while the desirable sulfone compounds which may be readily decomposed to yield substantially quantitative amounts of the poly-olefins are monomeric poly-olefin sulfones, i. e. mono-sulfones. In order to prevent or inhibit the formation of the amorphous insoluble poly-sulfones, the poly-olefinic hydrocarbons, prior to their reaction with sulfur dioxide, should be first treated to remove any organic peroxides which may be present therein because the presence of such peroxides during the treatment with sulfur dioxide tends to cause the formation of the poly-sulfones. Since the poly-olefins are quite reactive and tend to form organic peroxides, even by mere contact with air at ordinary temperatures and pressures, it is usually essential to take precautions to prevent any further formation of the organic peroxides in the interim between the above mentioned purification step and the time when the peroxide-free poly-olefins are reacted with sulfur dioxide under conditions which will favor the formation of the monomeric sulfones. This may be effected by reacting the poly-olefins with sulfur dioxide substantially immediately after the removal of the peroxides therefrom, by the addition of inhibitors such as pyrogallol, hydroquinone, pyrocatechol, p-tertiary butyl catechol, or the like, to the peroxide-free poly-olefins, by storage in an inert atmosphere, or by employing other means or methods of inhibiting peroxide formation. Since insoluble amorphous poly-sulfones are also formed when the addition reaction is effected at relatively low temperatures, e. g. ordinary room temperatures, it is advantageous to effect the reaction at temperatures of about 100° C. or even somewhat higher.

The reaction between the above outlined poly-olefinic hydrocarbons and the sulfur dioxide to form the unsaturated cyclic sulfones is preferably effected while maintaining the reactants in the liquid phase or at least under such conditions that the reactants are predominantly in the liquid state. Generally the reaction temperature should be maintained in the neighborhood of 100° C., although higher or lower temperatures may also be employed. The optimum reaction temperature depends at least in part upon the specific poly-olefinic hydrocarbons treated. When the operating temperature drops too low the addition reaction, even in the case of those poly-olefinic hydrocarbons which have a relatively high reaction rate, becomes so slow as to render the process uneconomical. On the other hand, care should be taken to prevent the use of temperatures which are sufficiently high to cause the decomposition of the formed sulfones back to the reactants. Although the sulfone formation reaction may be effected at pressures which are only sufficient to maintain the reactants in the liquid state at the operating temperature employed, higher pressures may also be used. In this connection, it must be noted that the reaction pressure is generally considerably higher than that at which the reactants are introduced into the reaction vessel. This is because it is generally preferable to effect the introduction of the reactants into the reaction vessel or autoclave at or below ordinary temperatures (in order to maintain the reactants in the liquid state during said introduction), whereas the reaction temperature is in the neighborhood of 100° C. Generally the reaction pressures thus generated in the autoclave are between about 100 and about 500 lbs. per sq. in., or even higher, depending in part on the specific poly-olefin treated. The residence time will vary depending on the specific poly-olefinic hydrocarbon or hydrocarbons which are reacted with sulfur dioxide to effect the formation of the corresponding unsaturated cyclic sulfones.

Although the mol ratio of the sulfur dioxide to the poly-olefin may vary within relatively wide limits, in order to effect a substantially quantitative conversion of the poly-olefins to the corresponding cyclic sulfones within a relatively short period of time, it is preferable (particularly when the poly-olefins are free from peroxides, e. g. when an inhibitor is employed) to use the sulfur dioxide in amounts greatly in excess of those necessary for the conversion of the poly-olefins into the corresponding mono-sulfones. Generally, other conditions being equal, an increase in the mol ratio of sulfur dioxide to the poly-olefinic hydrocarbon, e. g. 4-methyl pentadiene-1,3, raises the yield of the corresponding cyclic unsaturated mono-sulfone, i. e. 2,4-dimethyl-3-sulfolene, this increase in the yield of the mono-sulfones being effected without the use of any catalyst and/or restraining agents, the sole requirement being that the poly-olefins be free from organic peroxides.

After the termination of the addition reaction between the sulfur dioxide and the specific poly-olefinic hydrocarbons thus treated, the cyclic sulfones are separated from the unreacted hydrocarbons, if any, and from the excess sulfur dioxide (if an excess thereof is used), and the mono-sulfones thus formed are then decomposed to liberate the sulfur dioxide and recover an isomer of the poly-olefinic hydrocarbon originally reacted with the sulfur dioxide. This may be effected for example by heating the sulfone or sulfones to a temperature sufficiently high to cause the decomposition thereof. As a general rule, this heating should be effected under reduced pressures in order to inhibit or prevent the polymerization of the poly-olefins thus liberated. However, with certain of the sulfones it is possible to effect the decomposition at atmospheric pressure. The decomposition temperature will vary depending on the specific sulfone treated as well as on the pressure employed. For example, when effected at or about atmospheric pressure, the decomposition of 2,4-dimethyl-3-sulfolene necessitates a temperature of between about 120° C. and about 130° C., while the use of a reduced pressure, e. g. of the order of about 50 mm. of mercury, permits decomposition at temperatures between 80° C. and 120° C. The separation of the obtained poly-olefin from the reaction product may be effected by any known means; for example, when the decomposition of the cyclic sulfones is effected by distillation, the overhead gaseous fraction may be conveyed through scrubbers containing an alkaline solution, e. g. a 10% aqueous solution of sodium hydroxide, which removes the liberated sulfur dioxide, the remaining gaseous fraction comprising or consisting of the poly-olefinic isomers of the starting poly-olefinic material. Another method of separating the sulfur dioxide from the diolefins comprises scrubbing the overhead sulfur dioxide-containing gaseous mixture with a liquid hydrocarbon oil, e. g. a high boiling naphtha, kerosene or gas oil, which selectively dissolves the poly-olefins, which latter may then be separated from the solvent by any known means. This method of separation is described more fully in U. S. Patent 2,264,878.

The following examples are given for the purpose of further illustrating the invention. They are not to be considered as limiting the invention to the particular application or other conditions of operation or apparatus disclosed.

*Example I*

A freshly distilled and carefully separated hexadiene fraction having a boiling point of 76.70° C. at 763.1 mm. mercury and a refractive index of $n$-20/$D$ = 1.4520, which fraction therefore consisted substantially exclusively of 4-methyl pentadiene-1,3, was employed. This hexadiene was introduced together with liquefied sulfur dioxide into an evacuated bomb reactor, the mol ratio of the reactants being equal to about 9 mols of sulfur dioxide per mol of the hexadiene. Thereafter, the reactor was closed and placed into boiling water so as to maintain the reaction temperature within the reactor at about 100° C. This caused the reaction pressure to rise to about 500 lbs. per sq. in. The reaction was continued for about 8 hours, at the end of which time the minor amount of unreacted 4-methyl pentadiene-1,3 and the excess sulfur dioxide were vented. The remaining liquid fraction consisting of 2,4-dimethyl-3-sulfolene was introduced into a vessel disposed in an oil bath, distillation being effected at a temperature ranging from about 80° C. to about 120° C. at 50 mm. mercury pressure. The distilled overhead gases were scrubbed with a dilute alkali to remove the sulfur dioxide, the undissolved gases being then liquefied in a condenser. This fraction had the following properties.

Boiling point_____ 75.8° C. at 763 mm. Hg
Bromine No_____ 385 g. Br./100 g.
Specific gravity 20/4_____ 0.7326
Refractive index $n$-20/$D$_____ 1.4479
Maleic anhydride absorption__ Above 99 vol. per cent.

The above properties show that the poly-olefin thus obtained consisted of 2-methyl pentadiene-1,3.

In view of the fact that the reaction between 2-methyl pentadiene-1,3 and sulfur dioxide produces 2,4-dimethyl-3-sulfolene (which is also the product formed when 4-methyl pentadiene-1,3 is reacted with sulfur dioxide under sulfone-forming conditions), and since it was pointed out above that mixtures comprising both isomers of methyl pentadiene are formed when diacetone glycol is subjected to catalytic dehydration, it is possible to convert such methyl pentadiene mixtures directly to the 2-methyl pentadiene-1,3 without first separating the 2-methyl pentadiene-1,3 and then treating only the 4-methyl pentadiene-1,3 in accordance with the process of the present invention. The following example is illustrative of this phase of the invention.

*Example II*

A freshly distilled hexadiene fraction containing approximately 15% of 4-methyl pentadiene-1,3 and about 85% of 2-methyl pentadiene-1,3 was introduced into an evacuated autoclave together with liquefied sulfur dioxide employed in a mol ratio of about 4 mols of sulfur dioxide per mol of the acyclic hexadienes. The reactor was then closed and placed into boiling water so as to bring the reaction temperature within the reactor to about 100° C. The reaction was continued for a period of time sufficient to effect the conversion of substantially all of the methyl pentadienes to the corresponding cyclic sulfone, namely 2,4-dimethyl-3-sulfolene. The latter was separated from the effluent gases and was then decomposed in the same manner as that described in the previous example. After separation of the sulfur dioxide, the diene fraction was found to consist of 2-methyl pentadiene-1,3, thus indicating that the 4-methyl pentadiene-1,3 orginally present in the starting fraction was converted according to the present process to its structural isomer, viz. 2-methyl pentadiene-1,3.

Although the above examples were specific to the conversion of 4-methyl pentadiene-1,3 to its structural isomer, the process of the invention is equally applicable to the isomerization of the other poly-olefinic hydrocarbons specified herein, and particularly to the isomerization of the acyclic 1,3-dienes having at least six carbon atoms in the molecule, which dienes contain a hydrocarbon radical and preferably an alkyl radical or side chain in the 4-position.

We claim as our invention:

1. A process for the conversion of 4-methyl pentadiene-1,3 to 2-methyl pentadiene-1,3, which comprises mixing substantially peroxide-free 4-methyl pentadiene-1,3 with liquefied sulfur dioxide in a mol ratio of at least four mols of sulfur dioxide per mol of the methyl pentadiene, subjecting the mixture thus formed to a temperature of about 100° C., under a pressure of between about 100 lbs. per sq. in. and about 500 lbs. per sq. in. gage, and for a period of time sufficient to effect an addition reaction between the sulfur dioxide and substantially all of the 4-methyl pentadiene-1,3, thereby forming 2,4-dimethyl-3-sulfolene, separating said reaction product from the reaction mixture, subjecting the separated 2,4-dimethyl-3-sulfolene to a temperature of between about 80° C. and about 120° C. at about 50 mm. of mercury pressure, thereby effecting a decomposition of said sulfolene and the formation of an overhead fraction essentially comprising sulfur dioxide and 2-methyl pentadiene-1,3, and separating said 2-methyl pentadiene-1,3 from the last mentioned fraction.

2. A process for the conversion of 4-methyl pentadiene-1,3 to 2-methyl pentadiene-1,3, which comprising mixing substantially peroxide-free 4-methyl pentadiene-1,3 with liquefied sulfur dioxide in a mol ratio of at least four mols of the sulfur dioxide per mol of the methyl pentadiene, subjecting said mixture to a temperature of about 100° C. under a pressure of between about 100 lbs. per sq. in. and about 500 lbs. per sq. in. gage, and for a period of time sufficient to effect an addition reaction between the sulfur dioxide and substantially all of the 4-methyl pentadiene-1,3, thereby forming 2,4-dimethyl-3-sulfolene, separating said reaction product from the reaction mixture, decomposing said sulfolene into a mixture essentially comprising sulfur dioxide and 2-methyl pentadiene-1,3, and recovering the 2-methyl pentadiene-1,3 from said last-mentioned mixture.

3. A process for the conversion of 4-methyl pentadiene-1,3 to 2-methyl pentadiene-1,3, which comprises reacting 4-methyl pentadiene-1,3 with sulfur dioxide employed in an amount in excess of that necessary to combine with the methyl pentadiene, at an elevated temperature and under a superatmospheric pressure sufficient to maintain the reactants in the liquid state, effecting said reaction for a period of time sufficient to effect an addition reaction between the sulfur dioxide and the 4-methyl pentadiene-1,3, thereby forming 2,4-dimethyl-3-sulfolene, separating said reaction product from the reaction mixture, decomposing said sulfolene by subjecting it to an elevated temperature to form a mixture essentially comprising sulfur dioxide and 2-methyl pentadiene-1,3, and separating said 2-methyl pentadiene-1,3 from the last-mentioned mixture.

4. A process for the conversion of 4-methyl pentadiene-1,3 to 2-methyl pentadiene-1,3, which comprises contacting a mixture essentially comprising 4-methyl pentadiene-1,3 and 2-methyl pentadiene-1,3 with liquefied sulfur dioxide employed in an amount sufficient to combine with the hexadienes present therein, subjecting the mixture thus formed to an elevated temperature and a superatmospheric pressure sufficient to maintain the reactants in the liquid state, effecting said reaction for a period of time sufficient to cause an addition reaction between the sulfur dioxide and substantially all of the methyl pentadienes present in the reaction mixture, thereby forming 2,4-dimethyl-3-sulfolene, separating said sulfolene from the reaction mixture, subjecting said separated 2,4-dimethyl-3-sulfolene to decomposition to form a mixture essentially comprising sulfur dioxide and 2-methyl pentadiene-1,3, and separating said 2-methyl pentadiene-1,3 from the last-mentioned mixture.

5. The process according to claim 4 wherein the decomposition of the 2,4-dimethyl-3-sulfolene is effected by subjecting it to a temperature of between about 80° C. and 120° C.

6. A process for the conversion of 4-methyl pentadiene-1,3 to 2-methyl pentadiene-1,3, which comprises mixing a hydrocarbon fraction containing 4-methyl pentadiene-1,3 with sulfur dioxide employed in an amount in excess of that necessary to combine with the 4-methyl pentadiene-1,3, subjecting the mixture thus formed to an elevated temperature and a superatmospheric pressure sufficient to maintain a liquid phase in the reaction zone, effecting said reaction for a period of time sufficient to effect an addition reaction between the sulfur dioxide and substantially all of the 4-methyl pentadiene-1,3 present in the reaction mixture, thereby forming 2,4-dimethyl-3-sulfolene, separating said 2,4-dimethyl-3-sulfolene from the reaction mixture, decomposing said sulfolene to form a mixture essentially comprising sulfur dioxide and 2-methyl pentadiene-1,3, and recovering said last-mentioned methyl pentadiene therefrom.

7. In a process for the isomerization of a branched-chain poly-olefinic compound, the steps of mixing a poly-olefin having the general structural formula,

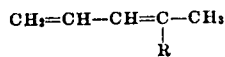

wherein R represents an alkyd radical, with sulfur dioxide employed in an amount sufficient to combine with said poly-olefin, subjecting said mixture to an elevated temperature and a superatmospheric pressure sufficient to maintain a liquid phase in the reaction zone, effecting the reaction for a period of time sufficient to effect the addition reaction between the sulfur dioxide and the poly-olefinic compound, thereby forming an unsaturated cyclic sulfone, separating said sulfone from the reaction mixture, subjecting said sulfone to an elevated temperature, thereby forming a mixture containing sulfur dioxide and a poly-olefin having the general structural formula

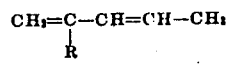

wherein R represents an alkyl radical, and separating the last-mentioned poly-olefin from said mixture.

8. In a process for the isomerization of a mono-branched chain poly-olefinic compound containing two olefinic linkages in the 1-and 3-positions and a single alkyl branch chain in the 4-position with respect to the first of the unsaturated carbon atoms, the steps of mixing said branched chain poly-olefinic compound with sulfur dioxide in an amount sufficient to combine with said poly-olefinic compound, subjecting the mixture to an elevated temperature, conducting the reaction for a period of time sufficient to effect an addition reaction and to form an unsaturated cyclic sulfone, and decomposing said sulfone to form a mixture containing sulfur dioxide and a branched chain poly-olefinic compound which is a structural isomer of the treated poly-olefinic compound, said resulting branched chain poly-olefinic compound containing the branch chain in the 2-position with respect to the first of the unsaturated carbon atoms.

RUPERT C. MORRIS.
JOHN L. VAN WINKLE.